Dec. 7, 1965  F. PAASCHE  3,221,869
CONVEYOR BELT
Filed Dec. 28, 1961
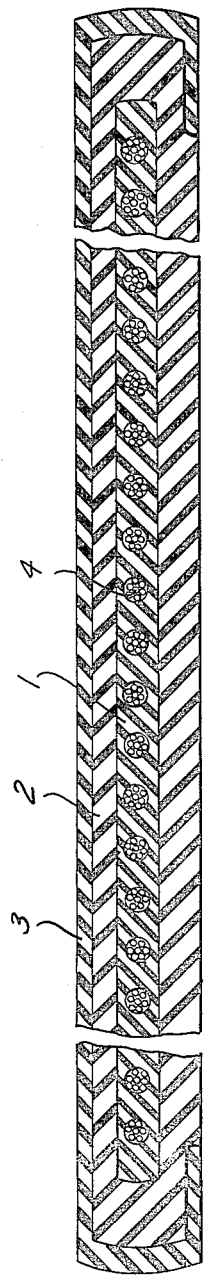
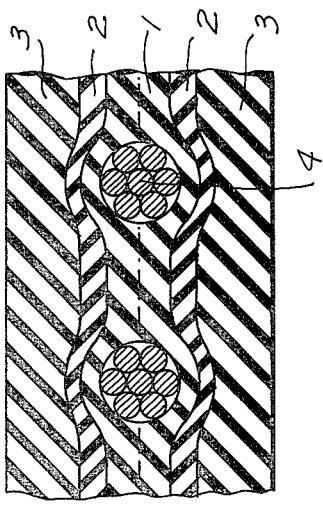
INVENTOR.
Fritz Paasche
BY
Michael S. Striker
Attorney

United States Patent Office 3,221,869
Patented Dec. 7, 1965

3,221,869
CONVEYOR BELT
Fritz Paasche, Cologne-Nippes, Germany, assignor to Franz Clouth Rheinische Gummiwarenfabrik Aktiengesellschaft, Cologne-Nippes, Germany
Filed Dec. 28, 1961, Ser. No. 162,892
2 Claims. (Cl. 198—193)

The present invention relates to a conveyor belt and, more particularly, to a reinforced flexible conveyor belt containing, as its only reinforcing element, a plurality of metal cables which extend substantially parallel to each other throughout the entire length of the conveyor belt.

Conventional reinforced conveyor belts of rubber or rubber-like material generally include reinforcing elements of spun, woven material. In addition, it has also been proposed to increase the tensile strength of the conveyor belt by employing reinforcing metal fabrics or cables, preferably in addition to the reinforcing elements of spun material.

However, generally it was assumed that rubber conveyor belts which included metal cables as the sole reinforcing element would not possess the desired qualities, particularly that such conveyor belts would be incapable of absorbing the transversal tension to which such conveyor belts are exposed when operating under load. Furthermore, it was assumed that such conveyor belts would be particularly sensitive against and easily harmed by being hit by rocks, lumps of coal or similar material which forms the load which is to be transported on the conveyor belt.

In view thereof, metal rope reinforced conveyor belts usually include an additional reinforcing element capable of absorbing lateral as well as longitudinal tension. Such additional reinforcing element usually consists of a woven fabric of spun material. Such woven reinforcing material serves to give the desired tensile strength in lateral direction, to limit the depth of penetration or puncturing of the conveyor belt when the same is hit by heavy and possibly sharp edged pieces of the material which is to be conveyed, and primarily such woven reinforcing material is incorporated for the purpose of preventing tearing of the conveyor belt in longitudinal direction.

It is an object of the present invention to provide a conveyor belt of satisfactory tensile strength, impact resistance and resistance against longitudinal tearing, without requiring the incorporation of two different types of reinforcing elements.

It is another object of the present invention to provide a reinforced conveyor belt of the desired high strength and tear resistance, which can be produced in a simple and economical manner, and which includes as its exclusive reinforcing element a plurality of longitudinally extended substantially parallel metal cables.

Other objects and advantages of the present invention will become apparent from a further reading of the description and of the appended claims.

With the above and other objects in view, the present invention contemplates a flexible conveyor belt comprising, in combination, a plurality of elongated flexible metallic reinforcing members arranged substantially parallel to each other, and a substantially strip-shaped layer of a material selected from the group consisting of synthetic and natural rubbers and having a high tear resistance, covering and firmly adhering to the plurality of elongated flexible metallic reinforcing members.

Thus, the present invention contemplates an improved conveyor belt consisting exclusively of a rubber layer or layers and of longitudinally extending reinforcing metal cables embedded in the rubber layer, which conveyor belt will be resistant against tearing, particularly also in longitudinal direction thereof.

Surprisingly it has been found that this result can be obtained by using as the embedding rubber layer, or for a rubber layer covering at least the upper face of the embedding rubber layer, a rubber mixture which possesses high tear resistance, i.e. high resistance against the further tearing of a torn portion, such as at least 30 kg./cm. and preferably 40 kg./cm. and more and, in addition thereto, by forming a strong bond between the reinforcing metal cables and the rubber layer surrounding the same, which bond should be at least as strong as that obtained between conventional textile reinforcements and the surrounding rubber layer.

Such firm bond between the metal cables and the surrounding rubber layer can be achieved by various means, such as the application of adhesives or by applying a binder layer of brass, i.e. by galvanically applying a thin brass layer to the cable, thereby improving the bond between the cable and the rubber vulcanized thereon.

A firm adhesive connection between the metal cables and the surrounding rubber layer may be formed by applying to the metal cables prior to embedding the same in the rubber layer, a 15% solution of chlorinated rubber in toluene or by applying a 20% solution of triphenylmethane tri-isocyanate in methylene chloride, or by using a mixture of these two adhesive solutions. The metal cables are to be defatted, for instance with trichloroethylene or other suitable organic agents and dried prior to application of the adhesive. The method of firmly adhering the metal cables to the surrounding rubber layer, as well as a suitable apparatus therefor are more fully described in my co-pending application Serial No. 105,087, filed April 24, 1961, now abandoned, entitled "Process and Apparatus for the Production of Reinforced Belting."

Only by combining high tear resistance of the rubber material with firm adherence between the reinforcing ropes and the surrounding rubber layer will it be avoided that the rubber layer separates from the reinforcing metal cables under the impact of heavy pieces of the particulate load dropped onto the conveyor belt. This is important because localized separation of reinforcing metal cables from the surrounding rubber layer is one of the most frequent causes of tear formation. Furthermore, it is prevented according to the present invention that a localized tearing of the rubber layer will spread or extend further.

Apart from the fact that elimination of one or more textile reinforcing layers will reduce the material and processing costs and thus represents a technological advantage, surprisingly it has been found that conveyor belts according to the present invention are of greater impact resistance against the load dropped thereon than belts which include reinforcing inserts extending at least partly in transversal direction, such as textile fabric reinforcements. The lower impact resistance of the conventional textile fabric and metal cable reinforced conveyor belts is probably due to the very limited transversal stretching of such fabric reinforcements when subjected to the impact of the load. Due to the fact that the textile fabric reinforcement adheres to the rubber layer, and the metal cables also adhere to the rubber layer, it may be assumed that the textile reinforcements are limited in their transversal extension as if they were directly and firmly attached between adjacent metal cables. In view of the relatively small transversal distance between adjacent metal cables, which distance generally is of the magnitude of about 5 mm., and in view of the limited extensibility of the fabric, which amounts only to about 10%, the extensibility of the fabric between adjacent metal cables equals only about 0.5 mm. This frequently is insufficient, and thus longitudinal tearing of the fabric reinforcement will occur. If, however, according to the present invention, the rubber layer between adjacent metal cables may be stretched transversally unimpeded in accordance with its properties, i.e., about between 30 and 50 times as much as the textile fabric, than in the absence of such textile fabric the rubber layer will be capable of absorbing the impact of the load dropped on the conveyor belt, provided that the tear resistance of the rubber layer is sufficient to prevent longitudinal extension of any localized superficial or surface fissures or tears which unavoidably will occur.

It is particularly advantageous, according to the present invention, to include a plurality of rubber layers in the metal cable-reinforced conveyor belt.

The novel features which are considered as characteristic for the invention are set forth in particular in the appended claims. This invention itself, however, both as to its construction and its method of operation, together with additional objects and advantages thereof, will be best understood from the following description of specific embodiments when read in connection with the accompanying drawings, in which:

FIG. 1 is a schematic cross-sectional view of a conveyor belt according to the present invention; and FIG. 2 is a fragmentary cross-sectional view of a preferred embodiment thereof.

Referring now to the drawing, it will be seen that the conveyor belt according to the illustrated embodiment comprises metal cables which are embedded in a first rubber layer 1. Rubber layer 1 is surrounded by rubber layer 2. However, it is also possible, that rubber layers 1 and 2 are of identical composition and integral with each other, thus forming a unitary layer in which metal cables 4 are embedded. At least one face of rubber layer 2 is covered with a third rubber layer or cover layer 3 which is preferably of such composition as to have an improved abrasion resistance while not necessarily a tear resistance as high as that of rubber layer 2 or of the unitary rubber layer 1 and 2. The different rubber layers of the conveyor belt adhere firmly to each other, and the metal cables are firmly, preferably adhesively, adhered to the rubber layer surrounding the same. Thus, cover layer 3 will have less tear resistance than second layer 2, while the tear resistance of the embedding layer 1 may be lower, higher or equal to the tear resistance of layer 2.

Tear resistance and abrasion resistance as referred to herein are determined in accordance with the German standards of norms DIN 53507 and DIN 53516, respectively.

It may be said that the combination of rubber layers of different qualities in a conveyor belt such as illustrated in the drawing, will improve the mechanical properties of a conveyor belt containing metal cables as the only reinforcing element, in a manner which is somewhat similar to the superiority of a plywood sheet over a natural wood sheet of similar dimensions. Furthermore, the multi layer belt according to the present invention which comprises a layer of high tear resistance and a layer of lesser tear resistance will resist the extension of localized tearing or fissures as strongly as if the conveyor belt would consist throughout of rubber of high tear resistance, provided that the different rubber layers are firmly adhered to each other.

Rubber layer 3 which is superposed and adheres to highly tear resistance layer 2 will generally form the load carrying surface of the conveyor belt. Broadly, it is required of the directly load carrying rubber layer that the same possesses a higher abrasion resistance and greater hardness and that this layer displays little tendency to adhere to the material which is to be conveyed thereon. The above properties generally are difficult to combine with high tear resistance. However, according to the present invention the tear resistance of cover layer 3 is greatly improved by its adherence to highly tear resistant layer 2.

Similarly, it is sometimes, desirable and advantageous to divide the properties of high tear resistance and ability firmly to adhere to the reinforcing cables between two rubber layers so that rubber layer 1 is so chosen as to assure firm adherence to cables 4, while rubber layer 2 is formed of a material possessing high tear resistance. Thus, the three requirements, namely firm adherence to the metal cables 4, high tear resistance and high abrasion resistance may be fulfilled by rubber layers 1, 2 and 3, respectively, each of the layers contributing one of the desired qualities.

In this manner, according to the present invention, it is possible to obtain a conveyor belt with metal cables as the only reinforcing element and without using textile or other additional reinforcing elements. Such conveyor belt, nevertheless, will be of a quality at least equal to that of conventional belts, particularly due to the fact that there is a firmer bond between belt core and cover portions and that the belt according to the present invention allows for a much greater degree of resilient stretching in transversal direction.

While the invention is mainly described herein with respect to conveyor belts comprising layers of natural rubber, it is also within the scope of the present invention to replace the natural rubber with synthetic rubber layers.

The following examples are given as illustrative only without, however, limiting the invention to the specific details of the example.

*Example 1*

A conveyor belt according to the drawing may comprise rubber layers of the following compositions:

| As third rubber layer or cover layer: | Parts by weight |
|---|---|
| Natural rubber | 100 |
| Sulfur | 2.5 |
| N-cyclohexyl-2-benzothiazylsulfenamide (as accelerator) | 0.6 |
| N-phenyl-N'-cyclohexyl-p-phenylenediamine (as an age resisting agent) | 2.0 |
| Ozocerite (as a light protective agent) | 2.0 |
| Stearic acid | 2.0 |
| Zinc oxide | 5.0 |
| Carbon black or furnace soot | 40.0 |

The above age resisting agent may be replaced by phenyl alphanaphthylamine and the light protective agent by ceresine.

| As second or highly tear resistant layer: | Parts by weight |
|---|---|
| Natural rubber | 100 |
| Sulfur | 3 |
| Dibenzothiazyldisulfide (accelerator) | 1 |
| Diphenylguanidine (accelerator) | 2 |
| Age resisting agent as above | 1.5 |
| Stearic acid | 1 |
| Naphthenic softener | 15 |
| Zinc oxide | 5 |
| Titanium dioxide | 5 |
| Precipitated silicic acid | 50 |

| As first rubber layer or embedding layer: | |
|---|---|
| Polychlorobutadiane | 100 |
| Age resisting agent as above | 2 |
| Stearic acid | 1 |
| Naphethenic softener | 10 |
| Zinc oxide | 5 |
| Magnesium oxide | 4 |
| Titanium dioxide | 5 |
| Precipitated silicic acid | 40 |

These layers possess the following qualities (abrasion determined only with respect to the cover layer):

|  | Cover Layer | Tear Resistant Layer | Embedding Layer |
|---|---|---|---|
| Tensile strength, kg./cm.² | 300 | 200 | 150 |
| Ultimate elongation, percent | 550 | 650 | 700 |
| Hardness, Shore A, degrees | 75 | 75 | 65 |
| Tear resistance, kg./cm | 25 | 40 | 35–45 |
| Abrasion, mm.³ | 100 | | |

The terms found in the foregoing table of properties are employed in the sense defined in "Glossary of Terms Relating to Rubber and Rubber-like Materials," Special Technical Publication 184 of the American Society for Testing and Materials. Specifically, the terms have the following meaning:

*Tensile strength.*—The maximum tensile stress which a material is capable of developing. It is the force per unit of the original cross-sectional area which is applied at the time of rupture of a specimen, and is known variously as "breaking load," "breaking stress," and "ultimate tensile strength." It is expressed in pounds per square inch or kilograms per square centimeter of cross-sectional area of the unstressed specimen. See ASTM Methods D412 and E6.

*Ultimate elongation.*—The extension between bench marks produced by a tensile force applied to a specimen, expressed as a percentage of the original distance between the marks. Ultimate elongation is the elongation at the moment of rupture. If a 1-in. length is marked on a specimen and it is stretched until the bench marks are 7 in. apart, the elongation is 7−1=6 in. or 600 percent. See ASTM Method D412[1].

*Hardness.*—The relative resistance of rubber to the penetration (without puncturing) of a blunt point impressed on its surface. See ASTM Methods D314, D531, D676[1].

*Tear resistance.*—The force required to tear completely across a specially designed nicked rubber test specimen, or right-angled test specimen, by elongating it at a specified rate. Expressed in pounds per inch of thickness of specimen. See ASTM Method D624[1].

*Abrasion resistance.*—The ability of a rubber compound to withstand mechanical action—such as rubbing, scraping, or erosion—which tends progressively to remove material from its surface. Test results are expressed as loss of volume in mm³.

As more fully described in my co-pending application Serial No. 105,087, after defatting and driving of the metal cables, the same are covered with the embedding layer and the other layers and then vulcanized, for instance under an absolute pressure of 21 atmospheres and at a temperature of 140° C.

*Example II*

Preferably, and as illustrated in FIGURE 2 of the drawing, the conveyor belt according to the present invention is formed in several steps, namely:

(1) Forming a composite plate by calendering layers 1, 2, and 3 together, whereby layer 1 will be only about half as thick as the layer 1 in the finished conveyor belt;

(2) Arranging metal cables in one plane, parallel to and at the desired distance from each other;

(3) Contacting opposite sides, respectively, of the arrangement of metal cables, with layers 1 of composite plates formed according to (1) above; and (4) Vulcanizing under heat and pressure the adjacent free faces of layers 1 to each other so as to embed the metal cables in the thus-formed unitary layer 1.

In FIGURE 2 of the drawing, the fact that layer 1 initially has been formed of two layers 1 of half the thickness of final layer 1 forming part of the conveyor belt, is indicated by the dotted line in the center of layer 1.

The total thickness of the conveyor belt illustrated in FIGURE 2 thus will be equal to substantially twice the thickness of the initially formed plates.

The conveyor belt described above and illustrated in FIGURE 2 of the drawing may be produced with rubber layers of the following compositions:

| | Parts by weight |
|---|---|
| As third rubber layer or cover layer: | |
| Cold polymerized SBR (styrene butadiene rubber) | 100 |
| Sulfur | 1.8 |
| N-cyclohexyl-2-benzothiazylsulfanamide | 1.25 |
| Age resisting agent as in Example I | 3 |
| Light protective agent as in Example I | 2 |
| Stearic acid | 2.5 |
| Softener (f.i. light process oil) | 5 |
| Zinc oxide | 3 |
| Carbon black ISAF (intermediate super abrasion furnace type) | 42 |
| As second or highly tear resistant layer: | |
| Natural rubber | 100 |
| Sulfur | 3.2 |
| Dibenzothiazyldisulfid with basic accelerator | 1.6 |
| Age resisting agent as in Example I | 1.8 |
| Stearic acid | 0.7 |
| Filler dispergarter (f. i. triethanol amine) | 5 |
| Softener | 15 |
| Zinc oxide | 5 |
| Titanium white | 10 |
| Pyrogenic silicic acid | 15 |
| Precipitated silic acid | 40 |
| As first rubber layer or embedding layer: | |
| Polychlorobutadiene | 75 |
| Natural rubber | 25 |
| Sulfur | 0.25 |
| Dibenzothiazyldisulfide | 1 |
| Stearic acid | 1 |
| Softener | 15 |
| Magnesia usta | 3 |
| Zinc oxide | 5 |
| Lithopene | 10 |
| Pyrogenic silicic acid | 35 |

The qualities of these layers are as follows:

|  | Cover Layer | Tear Resistant Layer | Embedding Layer |
|---|---|---|---|
| Tensile strength, kg./cm.² | 285 | 200 | 180 |
| Ultimate elongation, percent | 630 | 600 | 900 |
| Hardness, Shore A, degrees | 79 | 62 | 70 |
| Tear resistance, kg./cm | 10 | 40 | 40 |
| Abrasion, mm.³ | 75 | | |

The minimum specific adherence between the embedding rubber layer and the embedded metal cables is to be about 40 kg./cm². This is tested on a piece of conveyor belt according to the present invention, in which a centrally located cable extends at the one end of the piece of conveyor belt outwardly beyond the rubber layer, while the other cables extend outwardly in similar manner, however, at the other end of the piece of conveyor belt. The length of the complete portion of the conveyor belt (from which the cables extend outwardly as described herein) is 50 mm. The free ends of the cables are now gripped and pulled outwardly. In this manner the force is determined which is required to tear the single center cable from the embedding layer. This force divided by the square area of the rope surface which initially was embedded in the rubber layer, i.e. the force divided by $$\frac{50 \times 2 \times \pi r}{100}$$

(wherein "r" is the radius of the cable in millimeters) represents the specific adherence which should be at least about 40 kg./cm.².

Depending on the intended use of the conveyor belt according to the present invention, the same may have, and preferably has, the following dimensions:

| | |
|---|---|
| Total width mm | 500–3000 |
| Cable diameter mm | 4.3–9.3 |
| Distance between axes of adjacent cables mm | 10–15 |
| Thickness of layer 1 mm | About 4 |
| Thickness of each layer 2 mm | About 1 |
| Total thickness of conveyor belt mm | About 20 |
| Total number of cables depending on belt width and cable diameter | 40–265 |

It will be understood that each of the elements described above, or two or more together, may also find a useful application in other types of conveyor belts differing from the types described above.

While the invention has been illustrated and described as embodied in a flexible conveyor belt: it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A flexible conveyor belt comprising, in combination, a plurality of metal cables arranged substantially parallel to each other; a substantially strip-shaped first rubber layer having two opposite faces and having a high tear resistance, said cables being embedded in said first rubber layer and firmly adhesively adhering to said first rubber layer; and a second rubber layer having a high abrasion resistance greater than the abrasion resistance of said first rubber layer and a tear resistance lower than the tear resistance of said first rubber layer and having an outer surface constituting the load-carrying face of the belt, the opposite surface of said second rubber layer firmly adhering to at least one face of said first rubber layer, said metal cables forming the only reinforcing element of said conveyor belt.

2. A conveyor belt, comprising, in combination, a plurality of metal cables arranged substantially parallel to each other; a substantially strip-shaped first rubber layer having two opposite faces, firmly adhering to and covering said metal cables; at least one second rubber layer having a high tear resistance covering and firmly adhering to at least one face of said first rubber layer; and at least one third rubber layer having a high abrasion resistance greater than the abrasion resistance of said second rubber layer and a tear resistance lower than the tear resistance of said second rubber layer having an outer surface constituting the load-carrying face of the belt, the opposite surface of said third rubber layer firmly adhering to and covering at least the free face of said second rubber layer, said metal cables forming the only reinforcing element of said conveyor belt.

References Cited by the Examiner

UNITED STATES PATENTS

| | | | |
|---|---|---|---|
| 1,129,666 | 2/1915 | Gray | 161—144 XR |
| 1,865,310 | 6/1932 | Finney | 161—106 |
| 2,597,858 | 5/1952 | Freedlander | 29—130 |
| 2,851,389 | 9/1958 | Lappela | 161—143 |

FOREIGN PATENTS

| | | |
|---|---|---|
| 498,889 | 11/1950 | Belgium. |
| 839,624 | 5/1952 | Germany. |

ALEXANDER WYMAN, *Primary Examiner.*

EARL M. BERGERT, *Examiner.*